United States Patent
Tomonari

(10) Patent No.: US 7,557,149 B2
(45) Date of Patent: Jul. 7, 2009

(54) COLLOIDAL METAL SOLUTION, PROCESS FOR PRODUCING THE SAME, AND COATING MATERIAL CONTAINING THE SAME

(75) Inventor: Masanori Tomonari, Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 0 days.

(21) Appl. No.: 10/344,100

(22) PCT Filed: Aug. 6, 2001

(86) PCT No.: PCT/JP01/06742

§ 371 (c)(1), (2), (4) Date: Feb. 10, 2003

(87) PCT Pub. No.: WO02/13999

PCT Pub. Date: Feb. 21, 2002

(65) Prior Publication Data

US 2003/0170382 A1 Sep. 11, 2003

(51) Int. Cl.
 *G21F 1/10* (2006.01)
 *C08F 2/44* (2006.01)
(52) U.S. Cl. ..................... 523/137; 524/780
(58) Field of Classification Search ............ 523/137; 524/780; 427/123, 164, 383.1
See application file for complete search history.

(56) References Cited

U.S. PATENT DOCUMENTS

| | | | |
|---|---|---|---|
| 3,189,453 A * | 6/1965 | Herz et al. ................. 430/428 |
| 3,206,310 A * | 9/1965 | Herz ......................... 430/415 |
| 3,528,810 A | 9/1970 | Weyde et al. |
| 3,568,598 A * | 3/1971 | Abbott et al. ............... 101/465 |
| 3,647,440 A * | 3/1972 | Rasch ......................... 430/232 |
| 4,346,044 A * | 8/1982 | Dhein et al. ................... 554/1 |
| 5,094,840 A * | 3/1992 | Isobe et al. ................... 424/50 |
| 5,147,841 A | 9/1992 | Wilcoxon |
| 5,294,369 A | 3/1994 | Shigekawa et al. |
| 5,368,840 A * | 11/1994 | Unger ....................... 424/9.36 |
| 5,385,811 A * | 1/1995 | Hirano ....................... 430/438 |
| 5,501,851 A * | 3/1996 | Mudge et al. ............. 424/70.16 |
| 5,871,894 A * | 2/1999 | Takahashi et al. ........... 430/538 |
| 6,143,418 A | 11/2000 | Takamiya et al. |
| 6,261,479 B1 * | 7/2001 | Yukinobu et al. ........... 252/514 |
| 6,689,338 B2 * | 2/2004 | Kotov ....................... 424/1.69 |
| 2003/0054038 A1 * | 3/2003 | Crew et al. .................. 424/486 |

FOREIGN PATENT DOCUMENTS

| | | |
|---|---|---|
| JP | 49-122513 | 11/1974 |
| JP | 58036491 | 3/1983 |
| JP | 10-88207 | 4/1998 |
| JP | 10-195505 | 7/1998 |
| JP | 10330288 | * 12/1998 |
| JP | 11-60581 | 3/1999 |
| JP | 11-236521 | 8/1999 |
| JP | 2000-39737 | 2/2000 |
| WO | WO 99/01766 | 1/1999 |

OTHER PUBLICATIONS

NN70121752, IBM Technical Disclosure Bulletin, Dec. 1970.*
Windholz, M. (Editor) "The Merck Index" An Encyclopedia Of Chemicals And Drugs, Merck & Co., Inc. (1976) p. 1204, p. 9075.
Wuelfing, P., "Nanometer Gold Clusters . . . Polymer Electrolyte"J. Am. Chem. Soc., vol. 120 (48), pp. 12696-12697 (1998).
Dai 48kai, (199), Koubunshi Touron-kai, Oct. 6-8 Niigata Daigaku Igarashi Campus, "Koubunshi Gakkai Yokoushuu" vol. 48, No. 14, pp. 4113-4114 Sep. 20, 1999.
Brust et al.: "Synthesis of Thiol-Derivatised Gold Nanoparticles In A Two-Phase Liquid-Liquid System", J. Chem Soc., Chemical Communications, 1994, pp. 801-802.
Murthy et al.: "Liquid-phase synthesis of thiol-derivatized silver nanocrystals", Materials Letters, North Holland Publishing Co., vol. 30, No. 4, Mar. 1997, pp. 321-325.

* cited by examiner

*Primary Examiner*—Elena T Lightfoot
(74) *Attorney, Agent, or Firm*—Paul E. White; Manelli Denison & Selter PLLC

(57) ABSTRACT

The present invention relates to a colloidal metal solution comprising colloidal metal particles with a sulfur compound of low molecular weight such as mercaptoacetic acid, mercaptopropionic acid, mercaptoethanol, etc. as a protective colloid on the particle surfaces and having a pH of 8-14. According to the present invention, a colloidal metal solution having a high concentration and a distinguished dispersion stability with a small amount of the protective colloid can be provided with a commercially and economically high advantage without any operation such as centrifuge, etc.

7 Claims, 4 Drawing Sheets

Figure 1A:
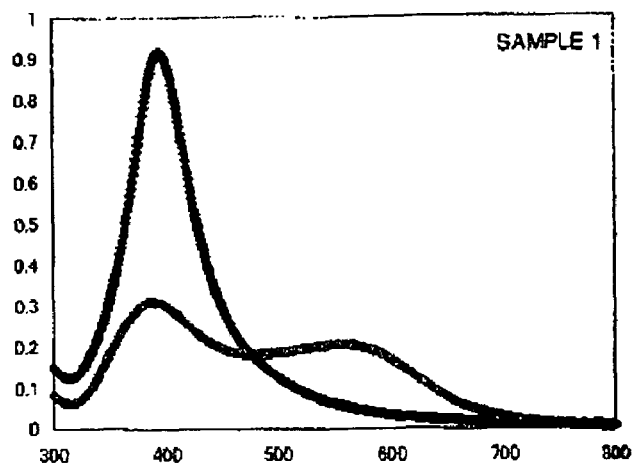
Figure 1B:
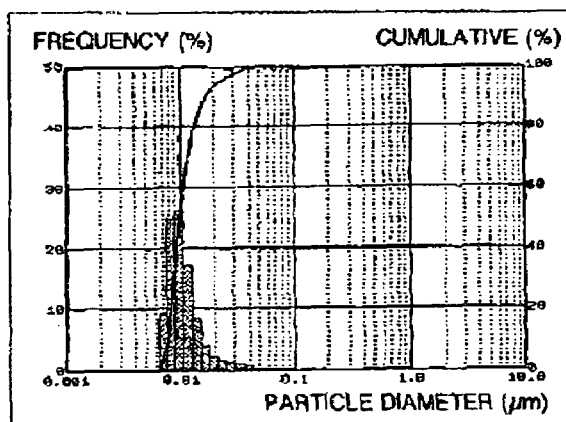
Figure 1C:
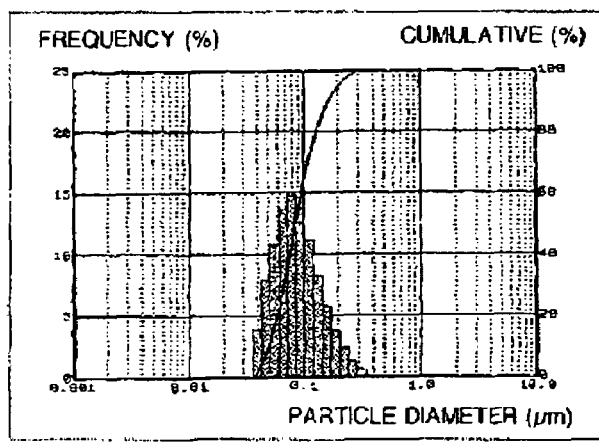
Figure 2A:
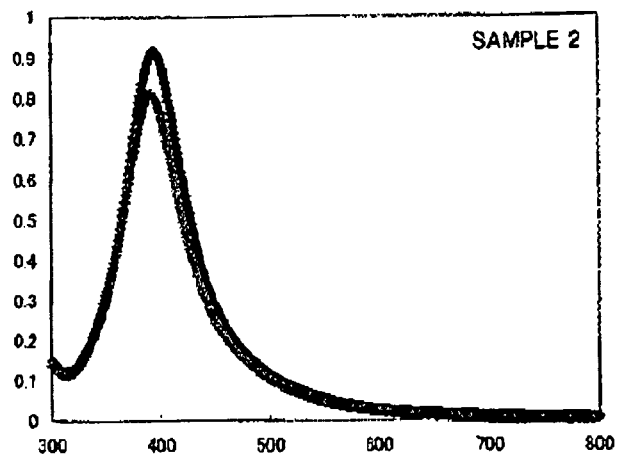
Figure 2B:
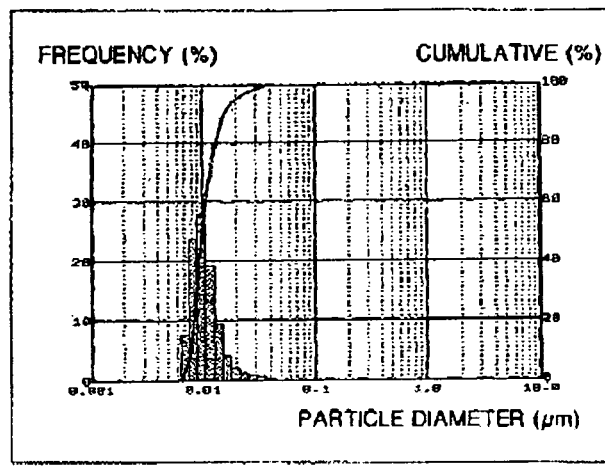
Figure 2C:
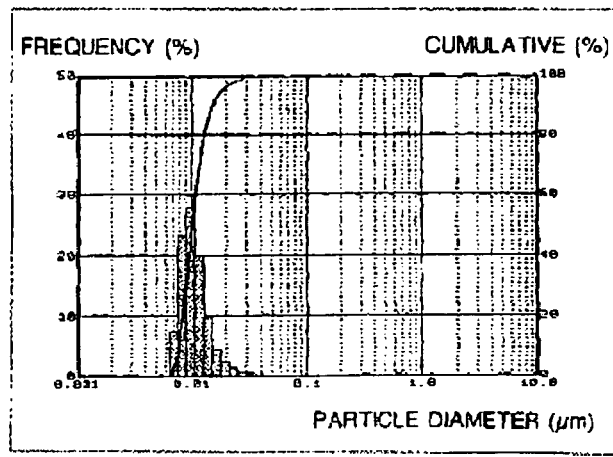
Figure 3A:
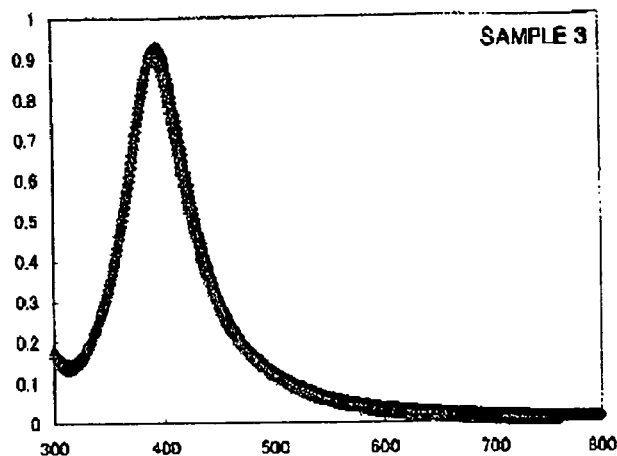
Figure 3B:
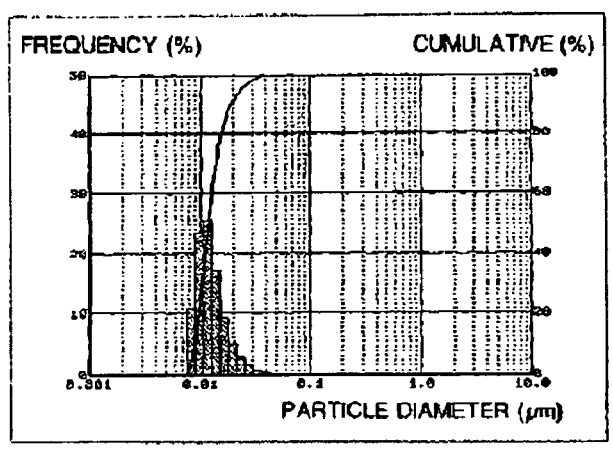
Figure 3C:
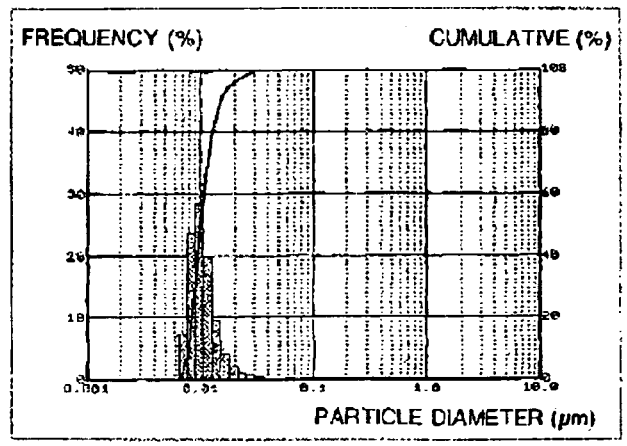
Figure 4A:
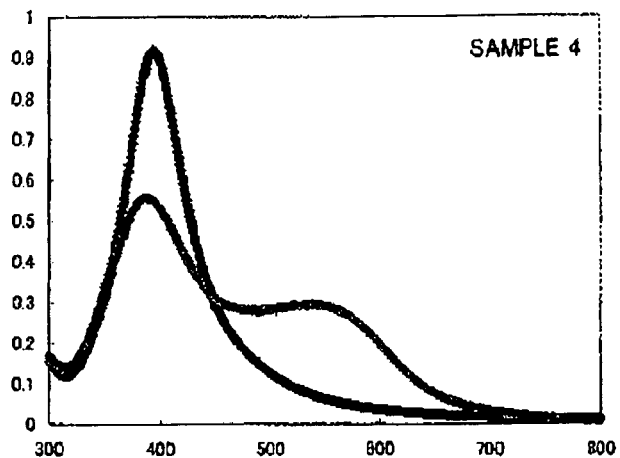
Figure 4B:
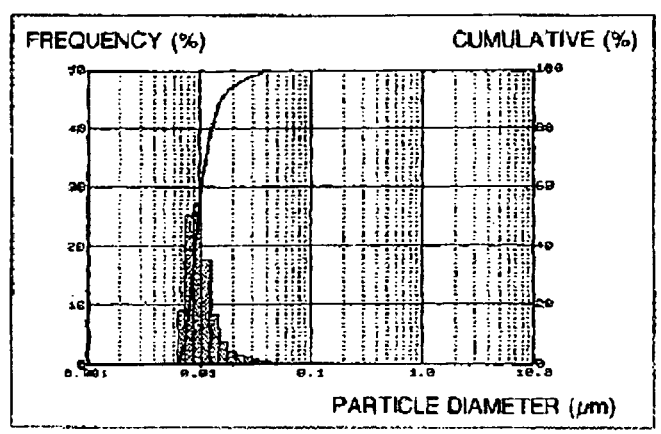
Figure 4C:
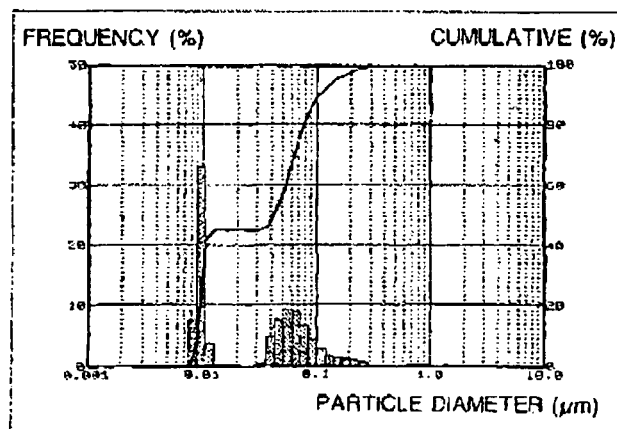

COLLOIDAL METAL SOLUTION, PROCESS FOR PRODUCING THE SAME, AND COATING MATERIAL CONTAINING THE SAME

TECHNICAL FIELD

The present invention relates to a solution containing colloidal metal particles as dispersed therein and a process for producing the same, and also to a paint using the colloidal metal solution.

BACKGROUND ART

Various transparent substrate materials such as plastics or glass for use in display screens of display devices such as picture tubes, liquid crystal displays, etc., window materials for clean rooms, and packaging materials for electronic parts, or films for use in overhead displays or photographs usually belong to insulating materials and thus are liable to be electrostatically charged. Accordingly, dust or fine powder is liable to gather around substrate surfaces, sometimes resulting in glitch of electronic appliances, etc. Influences of electromagnetic waves generated from personal computers and television screens on human bodies have been a current problem.

To provide antistatic protection or electromagnetic wave shielding, it is the usual practice to apply a coating agent or a paint containing electroconductive materials to substrates or mold a mixture of substrate materials and electroconductive materials. Metal particles are usually used as such electroconductive materials. Particularly, metal particles having average particles sizes of approximately 1-100 nm, the called colloidal metal particles, have a property capable of transmitting visible light, and thus are suitable for use in the transparent substrate materials. They are the most suitable electroconductive materials for electromagnetic wave shielding requiring a high electroconductivity. The colloidal metal particles are usually used in a colloidal metal solution state, where the colloidal metal particles are dispersed in a dispersion medium. However, the colloidal metal particles have a large surface energy due to very small particle sizes, and thus are liable to aggregate and hard to disperse stably in such dispersion media as water, organic solvents, etc. For the desired stable dispersion, it is known to protect the surfaces of the colloidal metal particles with a stabilizer called "protective colloid" before the dispersion.

For example, M Carey Lea: American Journal of Science, Vol. 37, pp. 476-491, 1889, discloses a method for preparing a colloidal metal solution by adding citric acid or its salt to an aqueous solution of a metal salt as a protective colloid and then a reducing agent such as ferrous ions, etc. thereto, followed by desalting and concentration. The method requires a large quantity of the protective colloid for stabilizion of the dispersion of colloid metal particles, resulting in another problem of lowering of the electroconductivity of colloidal metal particles. Furthermore, the stabilization of the dispersion by a protective colloid makes it hard to reaggregate the colloidal metal particles, and removal of salts from the colloidal metal solution and concentration of the colloidal metal particles need such operations as centrifuging, ultrafiltration, deionization, etc., requiring so large-scale apparatuses as to make the mass production unsuitable.

JP-A-10-195505 discloses a method for preparing colloidal metal particulate powders with thiol-protected surfaces by subjecting a solution containing a metal salt and an amine to reduction reaction, followed by addition of a thiol to the solution. The method is based on concentration of a solution containing colloidal metal particles in a rotary evaporator to separate the colloidal metal particles as powders and thus problems as to the desalting and the productivity have not been solved yet by the method. That is, it is hard to prepare a colloidal metal solution in good dispersion state.

DISCLOSURE OF THE INVENTION

The conventional colloidal metal solution has so far had only a highest concentration of colloidal metal particles of 1 wt. % due to a dispersion stability problem and also a commercial scale concentration technology problem.

An object of the present invention is to provide a colloidal metal solution capable of giving a high electroconductivity, etc. and keeping a distinguished dispersion stability for a long time and also to provide a paint using the colloidal metal solution.

Another object of the present invention is to provide a commercially and economically advantageous process for producing a colloidal metal solution capable of selecting the concentration of colloidal metal particles as desired without using a centrifuge or a rotary evaporator.

As a result of extensive studies, the present inventors have found that a colloidal metal solution prepared by using a sulfur compound of low molecular weight as a protective colloid and adjusting the pH of the solution to an alkaline side can keep the contained colloidal metal particles as stably dispersed therein for a long time, where the sulfur compound of low molecular weight has a distinguished protective colloid function, even if used in a small amount and also is easy to undergo thermal decomposition or volatilization, that is, easy to remove at the time of fixing the colloidal metal particles to a substrate, resulting in distinguished electroconductivity, etc. The present inventors have further found that, for the preparation of such a colloidal metal solution, colloidal metal particles with the sulfur compound of low molecular weight on the particle surfaces are prepared in a solution at first and then the pH of the solution is adjusted to an acidic side to make it easy to aggregate the colloidal metal particles and remove the salts and solvent. The aggregated colloidal metal particles hold the sulfur compounds on the particle surfaces and thus can be easily redispersed by adjusting the pH of the solution to an alkaline side. That is, a colloidal metal solution with a distinguished dispersion stability can be obtained thereby. The present inventors have further found that the colloidal metal particles can be fixed to the substrate by use of a two-component paint consisting of a first liquid comprising at least the colloidal metal solution and a second liquid comprising a curable resin component, and in case that the dispersion medium of the first liquid comprises water as the main component, the resulting coat film can have distinguished transparency, electroconductivity, etc., when a non-aqueous solvent of high dielectric constant and high boiling point is added to the first liquid. The present invention has been made upon further studies on the basis of these findings.

The present invention provides a colloidal metal solution, which comprises at least colloidal metal particles with a sulfur compound of low molecular weight on the particle surfaces and a dispersion medium, the solution containing not less than 1 wt. % of the colloidal metal particles and having a pH of 8-14. The present invention also provides a process for producing a colloidal metal solution, which comprises a first step of forming colloidal metal particles with a sulfur compound on the particle surfaces in a solution, a second step of adjusting the solution to a pH of not more than 5, thereby aggregating the colloidal metal particles and recovering the colloidal metal particles by filtration, and a third step of dispersing the recovered colloidal metal particles in a dispersion medium at a pH of 8-14. The present invention furthermore provides a paint, which comprises at least the colloidal metal and a curable resin, preferably the paint is a two-component paint, which comprises of a first liquid comprising at least the colloidal metal solution and a second liquid comprising at least a curable resin component. Still furthermore, the present invention provides a process for forming a coat film by use of the two-component paint and a process for producing an article with the coat film thereon.

BEST MODE FOR CARRYING OUT THE INVENTION

The present colloidal metal solution is a solution containing colloidal metal particles as dispersed therein, and the solution comprises at least colloidal metal particles with a sulfur compound of low molecular weight as a protective colloid on the particle surfaces, and a dispersion medium. The solution contains not less than 1 wt. %, preferably 2-50 wt. %, more preferably 5-50 wt. %, of the colloidal metal particles, and has a pH of 8-14, preferably 8-13, more preferably 8-12. The conventional colloidal metal solution contains only 1 wt. % of colloidal metal particles at a maximum concentration due to the dispersion stability problem and the commercial concentration technology problem, and thus compositions using the conventional colloidal metal solution have been suffered from considerably restrictions on desired design of combination and characteristics.

Metal species for use as components for the colloidal metal particles are not particularly limited, but at least one metal species selected from the groups consisting of Group 8 metals of the periodic table (iron, cobalt, nickel, ruthenium, rhodium, palladium, osmium, iridium and platinum) and Group 1B metals (copper, silver and gold) can be used in many applications, among which gold, silver, platinum, palladium and copper are particularly preferable due to distinguished electroconductivity, etc. Colloidal metal particles may be composed of an alloy of at least two of the aforementioned metal species, or may be composed of a mixture of at least two kinds of colloidal metal particles. Colloidal metal particles have an average particle size of approximately 1-100 nm, and those having an average particle size of 5-50 nm are preferable due to the distinguished transparency. The dispersion medium for use in the present colloidal metal solution includes a water solvent and at least one of organic solvents such as alcohol, etc. The colloidal metal solution preferably has a pH of 8-14, because the colloidal metal particles can be stably dispersed at a high concentration. When the colloidal metal solution has a lower pH than 8, the colloidal metal solution cannot be kept in a stable dispersion state for a long term. Preferably pH is lower than 13, because a basic substance as a pH-controlling agent will hardly give any influence on the electroconductivity.

The colloidal metal particles have a sulfur compound of low molecular weight on the particle surfaces as a protective colloid. Content of the sulfur compound is preferably 0.05-1.5 parts by weight on the basis of one part by weight of the colloidal metal particles, because a sufficient stabilization effect as the protective colloid can be obtained. The sulfur compound of low molecular weight, even if in a small proportion, has a good effect as the protective colloid. When used in a thermosetting composition, the sulfur compound is liable to decompose or volatilize at a lower temperature than 250° C. and thus can be removed without any large heat load on the substrate.

The sulfur compounds of low molecular weight are specifically those having molecular weights of 34-200, preferably 48-180, which include, for example, mercaptoacetic acid (molecular weight: 92; boiling point: 110-112° C.), mercaptopropionic acid (molecular weight 106, boiling point: 111-112° C./2.0×10$^3$ Pa), thiodipropionic acid (molecular weight: 178), mercaptosuccinic acid (molecular weight: 150) mercaptoethanol (molecular weight: 78; boiling point: 157° C. /99.7×10$^3$ Pa), thiodiethylene glycol (molecular weight: 122; boiling point: 164-166° C./2.7×10$^3$ Pa), thiodialycolic acid (molecular weight: 150), aminoethyl mercaptan (molecular weight: 77), thiodiethylamine (molecular weight: 120; boiling point 231-233° C./101.0×10$^3$ Pa), thiourethane (molecular weight: 105; decomposed at 150° C.), thiocarbonic acid (molecular weight: 110), thiourea (molecular weight: 76), thiophenol (molecular weight: 110; boiling point: 169° C.), thioformamide (molecular weight: 61), hydrogen sulfide (molecular weight: 34; boiling point: −61° C.), methyl mercaptan (molecular weight: 48; boiling point: 6° C.), ethyl mercaptan (molecular weight: 62; boiling point: 35° C.) thioacetic acid (molecular weight: 76; boiling point: 8700), propyl mercaptan (molecular weight: 72; boiling point: 68° C.), isopropyl mercaptan (molecular weight: 76; boiling point: 58° C.), n-butyl mercaptan (molecular weight: 90; boiling point: 98° C.), allyl mercaptan (molecular weight: 74; boiling point 67-69° C.), benzyl mercaptan (molecular weight: 124; boiling point: 195° C.), and their salts, derivatives, etc. At least one of these sulfur compounds can be used. Above all, thiol-based sulfur compounds (i.e. compounds with a SH group substituted for the hydrogen atom of aliphatic hydrocarbon, represented by the general formula RSH (where R is an alkyl group, etc.)) are preferable due to a higher affinity toward colloidal metal particles and a distinguished protective colloidal function, and mercaptoacetic acid, mercaptopropionic acid and mercaptoethanol are particularly preferable.

The present invention also provides a process for producing a colloidal metal solution, which comprises a first step of forming colloidal metal particles with a sulfur compound of low molecular weight on the particle surfaces in a solution, a second step of adjusting the solution to a pH of not more than 5, thereby aggregating the colloidal metal particles and recovering the colloidal metal particles by filtration, and a third step of dispersing the recovered colloidal metal particles into a dispersion medium at a pH of 8-14.

The first step is a step of forming colloidal metal particles with a sulfur compound of low molecular weight on the particle surfaces in a solution. Thus, a solution containing a compound of a metal capable of forming colloidal metal particles is adjusted to a pH of 8-14 in the presence of the sulfur compound of low molecular weight, thereby subjecting such a metal compound to reduction reaction, or the solution containing such a metal compound is adjusted to a pH of 8-14, and then the sulfur compound of low molecular weight is added thereto, thereby subjecting the metal compound to reduction reaction. When the pH of the solution is lower than 8, a portion of the metal compound will be precipitated to remain as not reduced. The pH of the solution containing the metal compound is in a range of preferably 8-13, more preferably 8-12.

The aforementioned sulfur compounds can be used as a sulfur compound of low molecular weight, and specifically those with a molecular weight of 34-200 are preferable, and those with a molecular weight of 48-180 are more preferable. Thiol-based sulfur compounds are further preferable, and at least one of mercaptoacetic acid, mercaptopropionic acid and mercaptoethanol is most preferably used. The sulfur compound is used preferably in a proportion of 0.05-1.5 parts by weight to one part by weight of the colloidal metal particles. When the reduction reaction of the metal compound is carried out in the absence of the sulfur compound of low molecular weight, the colloidal metal particles thus formed will be immediately precipitated, and the surfaces of the colloidal metal particles remain as not fully protected even by addition of the sulfur compound thereafter, making redispersion of the particles difficult. Thus, it is necessary to subject the metal compound to reduction reaction in the presence of the sulfur compound.

The metal compound is a compound of a metal capable to form colloidal metal particles by reduction reaction. For example, metal chlorides, metal sulfates, metal nitrates, metal carbonates, etc. can be used as the metal compound. Concentration of the metal compound in the solution is not limited, so long as the metal compound is soluble in the solution, and not less than 5 mmol/l is commercially preferable. As a solvent for dissolving the metal compound, water solvent or at least one of organic solvents such as alcohol, etc. can be used. To prepare an aqueous colloidal metal solution, the metal compound is preferably water-soluble, but sparingly water-soluble metal compounds can be also used together with a compound containing chloride ions, ammonia or the like, capable of forming soluble complexes with the metal component.

The reduction reaction can be carried out by adding a reducing agent to the solution of the metal compound or light irradiation. The reducing agent includes, for example, phosphorous acid, phosphinic acid, citric acid and their salts, sodium borohydride, hydrazine, aldehydes, amines, alcohols, etc., but is not particularly limited. The reduction reaction can be carried out at any temperature, and in case of the reduction reaction in an aqueous solution a temperature of 5°-90° C. is preferable, because the reaction can readily take place. For full, proceeding with the reduction reaction and stably dispersing the colloidal metal particles thus formed, the reducing agent is used preferably in a proportion of 0.2-50 moles to one mole of the metal compound. The light irradiation procedure is the so called light deposition procedure, which comprises irradiating the metal compound with light of appropriate wavelength to reduce the metal compound to the metal.

The second step is a step of adjusting the solution containing the colloidal metal particles obtained in the first step to a pH of not more than 5, preferably 0-5, by an acidic compound and so on, thereby aggregating the colloidal metal particles, and recovering the colloidal metal particles by filtration. The colloidal metal particles have a sulfur compound of low molecular weight on the particle surfaces as a protective colloid, and thus the colloidal metal particles can be readily aggregated by adjusting the solution to a pH of not more than 5, and can be recovered by a relatively simple separating operation such as suction filtration, sedimentation etc. The recovered colloidal metal particles can be washed to fully remove soluble salts by the ordinary method, resulting in preferable characteristics such as electroconductivity, etc.

The third step is a step of dispersing the colloidal metal particles resulting from the second step including washing, etc., if necessary, in a dispersion medium at a pH of 8-14, preferably 8-13, more preferably 8-12. The colloidal metal particles can be readily redispersed in a dispersing medium at a pH of 8-14 owing to the presence of the sulfur compound of low molecular weight on the particle surfaces. The colloidal metal particles are recovered usually as wet cakes by filtration, and thus can be redispersed with stirring by addition of a dispersion medium to the wet cakes. A mixer such as a line mill, a colloid mill, etc. may be used for the redispersion, if required. As a dispersion medium for redispersing the colloidal metal particles, a water solvent or at least one of organic solvents such as alcohol, etc. can be used. In the present invention, the colloidal metal particles can be made to have any desired concentration upon redispersion. For example, a highly concentrated colloidal metal solution containing 1-50 wt. % of colloidal metal particles can be obtained without any concentration, etc.

In the present invention, basic compounds for use in the pH adjustment include hydroxides of alkali metals or alkaline earth metals such as sodium hydroxide, potassium hydroxide, calcium hydroxide, etc., ammonium compounds such as ammonia etc., and amines or the like. Acidic compounds include inorganic acids such as hydrochloric acid, sulfuric acid, nitric acid, etc. and organic acids such as formic acid, acetic acid, propionic acid, etc. The basic compounds or the acidic compounds are not particularly limited. The present colloidal metal solution is useful as an electroconductive material and can be also used as an antibacterial agent, a coloring agent, a catalyst, etc.

The present invention also provides a paint comprising at least the colloidal metal solution and a curable resin component. Combination of the colloidal metal solution with a curable resin component such as inorganic resins, e.g. alkyl silicate, alkyl titanate, etc. or organic resins, e.g. acrylic resin, alkyd resin, polyester resin, urethane resin, epoxy resin, melamine resin, etc. can produce a paint capable of giving functions inherent to the colloidal metal particles. Any of cold curable type, baking curable type, ultraviolet curable type, etc. can be used as the curing resin component. Particularly a low temperature baking curable type is preferably used, since the sulfur compound of low molecular weight as a protective colloid can be decomposed or volatilized by heating at such a low temperature as not to place a thermal load to the substrate. Mixing proportion of the curable resin component can be properly selected. Proper selection of a dispersion medium for redispersing the colloidal metal particles can provide any of organic solvent-based paints and aqueous paints. In the present invention, a highly concentrated colloidal metal solution can be prepared and thus paints prepared from such a highly concentrated colloidal metal solution can have a higher solid concentration, a distinguished film formability, etc. Such paints can fix colloidal metal particles to ceramics, metals, etc. or particularly transparent substrates such as glass, plastics, films, etc., and thus can be used as electroconductive materials, antistatic materials, electromagnetic wave shielding materials, antibaterial materials, coloring materials, catalysts, etc.

The present paint is preferably a two-component paint which comprises a first liquid comprising at least the colloidal metal solution and a second liquid comprising at least a curable resin component. The two-component paint is particularly useful as an electroconductive paint, because a particularly high electroconductivity suitable for electromagnetic wave shielding can be obtained without any presence of the insulating curable resin component at the interface between the colloidal metal particles and the substrate by applying the first liquid containing no curable resin content at all and then applying the second liquid, followed by curing. The dispersion medium of the first liquid for such a two-component paint is usually water as the main component. When water is used as the dispersion medium of the first liquid, it is preferable to add a non-aqueous solvent of high dielectric constant and high boiling point thereto. The present colloidal metal solution uses a sulfur compound of low molecular weight as a protective colloid, and thus a steric hindrance action is hard to occur, and the colloidal metal particles are liable to aggregate when water is evaporated, because the surface tension of water can be kept high until curing is completed by heating and drying, but addition of the non-aqueous solvent of high dielectric constant and high boiling point can suppress aggregation of colloidal metal particles, resulting in desired electroconductivity and transparency. Ordinary dispersing agent such as a surfactant, etc. is not preferable to use, though depending upon desired uses, because it is strongly adsorbed onto the surfaces of colloidal metal particles to act sometimes as an electroconductivity-inhibiting factor. Furthermore, the non-aqueous solvent has preferably a lower surface tension, because mottled coloring takes place less on the coat film and distinguished smoothness free from wrinkling or shrinking can be obtained thereon.

Specifically, non-aqueous solvents have preferably a dielectric constant of not less than 35, more preferably 35-200, and preferably a boiling point of not lower than 100° C., more preferably 100° C. -250° C. Such non-aqueous solvents include N-methylformamide (dielectric constant: 190; boiling point: 197° C.), dimethyl sulfoxide (dielectric constant: 45, boiling point: 189° C.), ethylene glycol (dielectric constant: 38, boiling point: 226° C.), 4-butyrolactone (dielectric constant: 39, boiling point: 204° C.), acetamide (dielectric constant: 65, boiling point: 222° C.), 1,3-dimethyl-2-imidazolidinone (dielectric constant: 38, boiling point: 226° C.), formamide (dielectric constant: 111; boiling point: 210° C.), N-methylacetamide (dielectric constant: 175; boiling point: 205° C.), furfural (dielectric constant: 40; boiling point: 161° C.), etc., at least one of which can be used. Furthermore, the non-aqueous solvents have preferably a surface tension of not more than $50 \times 10^{-3}$ N/m, more preferably $10 \times 10^{-3}$-$50 \times 10^{-3}$ N/m. Such non-aqueous solvents include N-methylformamide (surface tension: $38 \times 10^{-3}$ N/m), dimethyl sulfoxide (surface tension: $43 \times 10^{-3}$ N/m), ethylene glycol (surface tension: $48 \times 10^{-3}$ N/m), 4-butyrolactone (surface tension: $44 \times 10^{-3}$ N/m), acetamide (surface tension: $39 \times 10^{-3}$ N/m), 1,3-dimethyl-2-imidazolidinone (surface tension: $41 \times 10^{-3}$ N/m), etc. Content of the non-aqueous solvent is preferably 15-900 parts by weight, more preferably 15-50 parts by weight, on the basis of 100 parts by weight of water contained in the first liquid.

The second liquid for the present two-component paint comprises at least a curable resin component. As the curable resin component, inorganic resins such as alkyl silicate, alkyl titanate, etc. and organic resins such as acrylic resin, alkyd resin, polyester resin, urethane resin, epoxy resin, melamine resin, etc. can be used, and any of cold curable type, baking curable type, ultraviolet curable type, etc. can be also used. Particularly a low temperature baking curable type is preferably used, since, the sulfur compound of low molecular weight as a protective colloid can be decomposed or volatilized by heating at such a low temperature as not to place a thermal load to the substrate. Mixing proportion of the curable resin component can be properly selected.

The first liquid or the second liquid may contain a filler such as colloidal silica, fine titanium oxide particles, fine tin oxide particles, etc., various additives, various coloring agents, a solvent such as alcohols, ketones, esters, aromatic compounds, aliphatic compounds, etc.; various dispersing agents, etc. The two-component paint can be used as electroconductivity-endowing materials, antistatic materials, electromagnetic wave shielding materials, etc. for substrates of glass, plastics, films, etc.

A coat film can be formed from the present two-component paint by applying the first liquid to a substrate, thereby forming a layer containing colloidal metal particles, then applying the second liquid to the layer, and curing the curable resin component. More specifically by applying the first liquid comprising colloidal metal particles with a sulfur compound of low molecular weight on the particle surfaces to a substrate by spin coating, dip coating, bar coating, spray coating or the like, thereby forming a layer containing the colloidal metal particles on the substrate surface, then applying the second liquid to the layer likewise and curing the curable resin component by heating, drying or the like, thereby fixing the colloidal metal particles to the substrate surface to form a coat film on the substrate surface. The coat film thus obtained has distinguished electroconductivity, antistatic property, electromagnetic wave shielding property, etc., for example, a distinguished electroconductivity of preferably not more than $1 \times 10^3$ Ω/square in terms of a surface resistance given by a resistance per unit area. Film thicknesses of applied first and second liquids are not particularly limited, but are preferably in a range of 0.01-10 μm, respectively, from the viewpoints of workability and levelling property. Articles with a coat film containing the colloidal metal particles on the surfaces can be prepared by the aforementioned application method. Various articles can be used for the application, for example, plastic products, film products, paper products, glass products, ceramic products, etc., specifically, display devices such as picture tubes, liquid crystal display devices, etc., window materials for clean rooms, packaging materials for electronic parts, films for use in overhead displays, photographs etc. and so forth.

EXAMPLES

The present invention will be described in detail below, referring to Examples, which should not be interpreted to be restrictive of the present invention.

Example 1

1. First Step 3.0 g of mercaptoacetic acid as a sulfur compound of low molecular weight was added to 1,000 ml of an aqueous silver nitrate solution having a concentration of 50 mmol/l with stirring, followed by adjusting the aqueous solution to a pH of 10.0 with ammonia water (26%). 50 ml of an aqueous sodium borohydride having a concentration of 400 mmol/l as a reducing agent was quickly added to the aqueous solution at room temperature to conduct reduction reaction. Colloidal silver particles with mercaptoacetic acid on the particle surfaces were formed in the solution thereby.

2. Second Step

The solution obtained in the first step was adjusted to a pH of 3.0 with nitric acid (20%) to precipitate the colloidal silver particles, and then the precipitated colloidal silver particles were recovered by a vacuum filter and washed with water until the electroconductivity of the filtrate reached not more than 10.0 μS/cm, whereby wet cakes of colloidal silver particles were obtained.

3. Third Step

The wet cakes of colloidal silver particles recovered in the second step by filtration were added to water to make a concentration of the colloidal silver particles 10%, and redispersed therein with stirring while adjusting the solution to a pH of 9.0 with ammonia water (26%), whereby the present colloidal silver solution (Sample A) was obtained.

Example 2

The present colloidal silver solution (Sample B) was obtained in the same manner as in Example 1, except that the aqueous sodium borohydride solution used in the first step of Example 1 as a reducing agent was replaced with 50 ml of an aqueous hydrazine solution having a concentration of 800 mmol/l.

Example 3

The present colloidal silver solution (Sample C) was obtained in the same manner as in Example 1, except that the mercaptoacetic acid used in the first step of Example 1 as a sulfur compound of low molecular weight was replaced with 3.0 g of 3-mercaptopropionic acid.

Example 4

The present colloidal silver solution (Sample D) was obtained in the same manner as in Example 1 except that the mercaptoacetic acid used in the first step of Example 1 as a sulfur compound of low molecular weight was replaced with 3.0 g of 2-mercaptoethanol.

Example 5

The present colloidal silver solution (Sample E) was obtained in the same manner as in Example 1 except that the ammonia water used in the third step of Example 1 as a basic substance of pH-adjusting agent was replaced with 2-aminoethanol.

Example 6

The present colloidal silver solution (Sample F) was obtained in the same manner as in Example 1 except that the ammonia water used in the third step of Example 1 as a basic substance of pH-adjusting agent was replaced with an aqueous sodium hydroxide solution (10%).

Example 7

The present colloidal silver solution (Sample G) was obtained in the same manner as in Example 1 except that the water used in the third step of Example 1 as a dispersion medium was replaced with a mixture of ethanol (25%) and water.

Example 8

The present colloidal silver solution (Sample H) was obtained in the same manner as in Example 1 except that the water used in the third step of Example 1 as a dispersion medium was replaced with a mixture of 2-propanol (25%) and water.

Example 9

1. First Step 3.0 g of 3-mercaptopropionic acid as a sulfur compound of low molecular weight was added to 1,000 ml of an aqueous palladium chloride solution having a concentration of 50 mmol/l with stirring and then the aqueous solution was adjusted to a pH of 10.0 with ammonia water (26%). 50 ml of an aqueous hydrazine solution having a concentration of 800 mmol/l as a reducing agent was quickly added to the aqueous solution at room temperature to conduct reduction reaction, whereby colloidal palladium particles with 3-mercaptopropionic acid on the particle surfaces were formed in the solution. The aqueous palladium chloride solution was prepared by adding 0.8 parts by weight of sodium chloride to one part by weight of palladium chloride, followed by dissolution into water.

2. Second Step

The solution obtained in the first step was adjusted to a pH of 3.0 with hydrochloric acid (20%) to precipitate colloidal palladium particles. The colloidal palladium particles were recovered by a vacuum filter and washed with water until the electroconductivity of the filtrate reached not more than 10.0 µS/cm, whereby wet cakes of colloidal palladium particles were obtained.

3. Third Step

The wet cakes of colloidal palladium particles recovered in the second step by filtration were added to water to make a concentration of colloidal palladium particles 10%, and redispersed in water with stirring, while adjusting the aqueous solution to a pH of 9.0 with ammonia water (26%), whereby the present colloidal palladium solution (Sample I) was obtained.

Example 10

1. First Step 1.5 g of 3-mercaptopropionic acid as a sulfur compound of low molecular weight was added to 1,000 ml of an aqueous chloroplatinic acid solution having a concentration of 25 mmol/l with stirring, and then the aqueous solution was adjusted to a pH of 10.0 with ammonia water (26%). 50 ml of an aqueous hydrazine solution having a concentration of 1,600 mmol/l as a reducing agent was quickly added to the aqueous solution at room temperature to conduct reduction reaction, whereby colloidal platinum particles with 3-mercaptopropionic acid on the particle surfaces were formed in the solution.

2. Second Step

The solution obtained in the first step was adjusted to a pH of 3.0 with hydrochloric acid (20%) to precipitate colloidal platinum particles, and the colloidal platinum particles were recovered by a vacuum filter and washed with water until the electroconductivity of the filtrate reached not more than 10.0 µS/cm, whereby wet cakes of colloidal platinum particles were obtained.

3. Third Step

The wet cakes of colloidal platinum particles recovered in the second step by filtration were added to water to make a concentration of colloidal platinum particles 10%, and redispersed in water with stirring while adjusting the solution to a pH of 9.0 with ammonia water (26%), whereby the present colloidal platinum solution (Sample J) was obtained.

Example 11

1. First Step 1.5 g of 3-mercaptopropionic acid as a sulfur compound of low molecular weight was added to 1,000 ml of an aqueous chloroauric acid solution having a concentration of 25 mmol/l with stirring, and then the aqueous solution was adjusted to a pH of 10.0 with ammonia water (26%). 50 ml of an aqueous hydrazine solution having a concentration of 1,200 mmol/l as a reducing agent was quickly added to the aqueous solution at room temperature to conduct reduction reaction, whereby colloidal gold particles with 3-mercaptopropionic acid on the particle surfaces were formed in the solution.

2. Second Step

The solution obtained in the first step was adjusted to a pH of 3.0 with hydrochloric acid (20%) to precipitate the colloidal gold particles, and the colloidal gold particles were recovered by a vacuum filter and washed with water until the electroconductivity of the filtrate reached not more than 10.0 µS/cm, whereby wet cakes of colloidal gold particles were obtained.

3. Third Step

The wet cakes of colloidal gold particles recovered in the second step by filtration were added to water to make a concentration of colloidal gold particles 10% and redispersed in water with stirring while adjusting the solution to a pH of 9.0 with ammonia water (26%), whereby the present colloidal gold solution (Sample K) was obtained.

Example 12

1. First Step 3.0 g of mercaptoacetic acid as a sulfur compound of low molecular weight was added to 1,000 ml of an aqueous copper acetate solution having a concentration of 50 mmol/l with stirring, and the aqueous solution was adjusted to a pH of 10.0 with ammonia water (26%). 50 ml of an aqueous sodium borohydride solution having a concentration of 800 mmol/l as a reducing agent was quickly added to the aqueous solution to conduct reduction reaction, whereby colloidal copper particles with mercaptoacetic acid on the particle surfaces were formed in the solution.

2. Second Step

The solution obtained in the first step was adjusted to a pH of 3.0 with nitric acid (20%) to precipitate the colloidal copper particles, and the colloidal copper particles were recovered by a vacuum filter and were washed with water until the electroconductivity of the filtrate reached not more than 10.0 µS/cm, whereby wet cakes of colloidal copper particles were obtained.

3. Third Step

The wet cakes of colloidal copper particles recovered in the second step by filtration were added to water to make a concentration of colloidal copper particles 10%, and redispersed in water with stirring, while adjusting the solution to a pH of 9.0 with ammonia water (26%), whereby the present colloidal copper solution (Sample L) was obtained.

Example 13

1. First Step 3.8 g of sodium borohydride as a reducing agent was dissolved in 3,000 ml of water, and the aqueous solution was adjusted to a pH of 11.0 with ammonia water (26%), followed by addition of 2.5 g of mercaptoacetic acid as a sulfur compound of low molecular weight thereto to prepare an aqueous solution mixture of the reducing agent and the sulfur compound of low molecular weight. 20.0 g of silver nitrate was dissolved in 2,000 ml of water, and the aqueous solution was adjusted to a pH of 11.0 with ammonia water (26%) and then all the amount of the aqueous solution mixture was added to the aqueous solution with stirring at room temperature over 30 minutes to conduct reduction reaction, whereby colloidal silver particles with mercaptoacetic acid on the particle surfaces were formed in the solution. A molar ratio of the reducing agent to the silver nitrate was 0.85.

2. Second Step

The solution obtained in the first step was adjusted to a pH of 3.0 with nitric acid (20%) to precipitate the colloidal silver particles, and the colloidal silver particles were recovered by a vacuum filter and washed with water until the electroconductivity of the filtrate reached not more than 10.0 µS/cm, whereby wet cakes of colloidal silver particles were obtained.

3. Third Step

The wet cakes of colloidal silver particles recovered in the second step by filtration were added to water to make a concentration of colloidal silver particles 10%, and redispersed in water with stirring by adjusting the aqueous solution to a pH of 9.0 with ammonia water (26%), whereby the present colloidal silver solution (Sample M) was obtained.

Example 14

1. First Step 12.5 g of hydrazine monohydrate having a concentration of 80% as a reducing agent was dissolved into 3,000 ml of water and the aqueous solution was adjusted to a pH of 10.0 with ammonia water (26%) to prepare an aqueous solution of the reducing agent. 20.8 g of palladium chloride and 6.6 g of sodium chloride were together dissolved into 3,000 ml of water, and 2.5 g of 3-methylmercaptopropionic acid as a sulfur compound of low molecular weight was added thereto. The resulting aqueous solution was adjusted to a pH of 10.0 with ammonia water (26%) and admixed with all the amount of the aqueous solution of the reducing agent with stirring at room temperature over 30 minutes to conduct reduction reaction, whereby colloidal palladium particles with 3-methylmercaptopropionic acid on the particle surfaces were formed in the solution. A molar ratio of the reducing agent to the palladium chloride was 1.70.

2. Second Step

The solution obtained in the first step was adjusted to a pH of 3.0 with hydrochloric acid (20%) to precipitate the colloidal palladium particles and the colloidal palladium particles were recovered by a vacuum filter and washed with water until the electroconductivity of the filtrate reacted not more than 10.0 µS/cm, whereby wet cakes of colloidal palladium particles were obtained.

3. Third Step

The wet cakes of colloidal palladium particles recovered in the second step by filtration were added to water to make a concentration of colloidal palladium particles 10% and redispersed in water with stirring while adjusting the aqueous solution to a pH of 9.0 with ammonia water (26%), whereby the present colloidal palladium solution (Sample N) was obtained.

Example 15

The present colloidal silver solution (Sample O) was obtained in the same manner as in Example 1 except that in place of addition of sodium borohydride in the first step of Example 1 light irradiation was made for 3 hours with an SHL-100 UV type high pressure mercury lamp (made by Toshiba Corp.) to conduct reduction reaction.

Example 16

1. First Step 10.0 g of sodium borohydride as a reducing agent was dissolved into 1,500 ml of water and the resulting aqueous solution was adjusted to a pH of 11.0 with ammonia water (26%) to prepare an aqueous solution of the reducing agent. 170.0 g of silver nitrate was dissolved into 2,000 ml of water and 10.8 g of 3-mercaptopropionic acid as a sulfur compound of low molecular weight was added thereto, and the resulting aqueous solution was adjusted to a pH of 13.0 with ammonia water (26%) and then all the amount of the aqueous solution of the reducing agent was added to the resulting aqueous solution with stirring at room temperature over 60 minutes to conduct reduction reaction, whereby colloidal silver particles with 3-mercaptopropionic acid on the particle surfaces were formed in the solution. A molar ratio of the reducing agent to the silver nitrate was 0.26.

2. Second Step

The solution obtained in the first step was adjusted to a pH of 3.0 with nitric acid (20%) to precipitate the colloidal silver particles, and the colloidal silver particles were recovered by a vacuum filter and washed with water until the electroconductivity of the filtrate reached not more than 10.0 µS/cm, whereby wet cakes of colloidal silver particles were obtained.

3. Third Step

The wet cakes of colloidal silver particles recovered in the second step by filtration were added to water to make a concentration of colloidal silver particles 10%, and redispersed in water with stirring while adjusting the aqueous solution to a pH of 9.0 with n-butylamine, whereby the present colloidal silver solution (Sample P) was obtained.

Example 17

1. First Step 20.0 g of sodium borohydride as a reducing agent was dissolved into 1,500 ml of water and the resulting aqueous solution was adjusted to a pH of 11.0 with ammonia water (26%) to prepare an aqueous solution of the reducing agent. 177.3 g of palladium chloride was dissolved into 2,000 ml of water and 10.6 g of 3-mercaptopropionic acid as a sulfur compound of low molecular weight was added thereto. The resulting aqueous solution was adjusted to a pH of 13.0 with ammonia water (26%) and then all the amount of the aqueous solution of the reducing agent was added to the resulting aqueous solution with stirring at room temperature over 60 minutes to conduct reduction reaction, whereby colloidal palladium particles with 3-mercaptopropionic acid on the particle surfaces were formed in the solution. A molar ratio of the reducing agent to the palladium chloride was 0.53.

2. Second Step

The solution obtained in the first step was adjusted to a pH of 3.0 with nitric acid (20%) to precipitate the colloidal palladium particles, and the colloidal palladium particles were recovered by a vacuum filter and washed with water until the electroconductivity of the filtrate reached not more than 10.0 µS/cm, whereby wet cakes of colloidal palladium particles were obtained.

3. Third Step

The wet cakes of colloidal palladium particles recovered in the second step by filtration were added to water to make a concentration of colloidal palladium particles 10% and redispersed in water with stirring while adjusting the aqueous solution to a pH of 9.0 with n-butylamine, whereby the present colloidal palladium solution (Sample Q) was obtained.

Example 18

1. First Step 30.0 g of sodium borohydride as a reducing agent was dissolved into 1,500 ml of water, and the resulting aqueous solution was adjusted to a pH of 11.0 with ammonia water (26%) to prepare an aqueous solution of the reducing agent. 412.0 g of chloroauric acid tetrahydrate was dissolved into 2,000 ml of water, and 19.7 g of mercaptoacetic acid as a sulfur compound of low molecular weight was added thereto. The resulting aqueous solution was adjusted to a pH of 13.0 with ammonia water (26%) and then all the amount of the aqueous solution of the reducing agent was added to the resulting aqueous solution with stirring at room temperature over 60 minutes to conduct reduction reaction, whereby colloidal gold particles with mercaptoacetic acid on the particle surfaces were formed in the solution. A molar ratio of the reducing agent to the chloroauric acid was 0.79.

2. Second Step

The solution obtained in the first step was adjusted to a pH of 3.0 with nitric acid (20%) to precipitate the colloidal gold particles, and the colloidal gold particles were recovered by a vacuum filter and washed with water until the electroconductivity of the filtrate reached not more than 10.0 µS/cm, whereby wet cakes of colloidal gold particles were obtained.

3. Third Step

The wet cakes of the colloidal gold particles recovered in the second step by filtration were added to water to make a concentration of the colloidal gold particles 10%, and redispersed in water with stirring while adjusting the aqueous solution to a pH of 9.0 with n-butylamine, whereby the present colloidal gold solution (Sample R) was obtained.

Example 19

1. First Step 40.0 g of sodium borohydride as a reducing agent was dissolved in 1,500 ml of water, and the resulting aqueous solution was adjusted to a pH of 11.0 with ammonia water (20%) to prepare an aqueous solution of the reducing agent. 518.0 g of chloroplatinic acid hexahydrate was dissolved into 2,000 ml of water, and 19.5 g of mercaptoacetic acid as a sulfur compound of low molecular weight was added thereto. The resulting aqueous solution was adjusted to a pH of 13.0 with ammonia water (26%) and all the amount of the aqueous solution of the reducing agent was added to the resulting aqueous solution with stirring at room temperature over 60 minutes to conduct reduction reaction, whereby colloidal platinum particles with mercaptoacetic acid on the particle surfaces were formed in the solution. A molar ratio of the reducing agent to the chloroplatinic acid was 1.06.

2. Second Step

The solution obtained in the first step was adjusted to a pH of 3.0 with nitric acid (20%) to precipitate colloidal platinum particles, and the colloidal platinum particles were recovered by a vacuum filter and washed with water until the electroconductivity of the filtrate reached not more than 10.0 μS/cm, whereby wet cakes of the colloidal platinum particles were obtained.

3. Third Step

The wet cakes of the colloidal platinum particles recovered in the second step by filtration were added to water to make a concentration of the colloidal platinum particles 10%, and redispersed in water with stirring while adjusting the aqueous solution to a pH of 9.0 with n-butylamine, whereby the present colloidal platinum solution (Sample S) was obtained.

Comparative Example 1

Treatment was carried out in the same manner as in Example 1 except that the mercaptoacetic acid used in the first step of Example 1 was not used, and black precipitates were formed by addition of the aqueous sodium borohydride solution, but failed to redisperse. No colloidal silver solution was obtained.

Comparative Example 2

Treatment was carried out in the same manner as in Example 1 except that 3.0 g of acetic acid was used in place of the mercaptoacetic acid used in the first step of Example 1, and black precipitates were formed by addition of the aqueous sodium borohydride solution, but failed to redisperse. No colloidal silver solution was obtained.

Comparative Example 3

In the first step of Example 1, 3.0 g of citric acid monohydrate was used in place of the mercaptoacetic acid. A colloidal silver solution was obtained by addition of the aqueous sodium borohydride solution but black precipitates were also formed in the solution. The precipitates were separated from the solution by filtration and the filtrate was adjusted to a pH of 3.0 with nitric acid (20%), but no colloidal silver particles failed to precipitate and could not be recovered by filtration.

Comparative Example 4

In Comparative Example 3, the amount of added citric acid monohydrate was increased to 50 g, and a colloidal silver solution was obtained by addition of the aqueous sodium borohydride. The solution was adjusted to a pH of 3.0 with nitric acid (20%), but colloidal silver particles failed to precipitate and could not recovered by filtration.

Comparative Example 5

Treatment was carried out in the same manner as in Example 9 except that the 3-mercaptopropionic acid used in the first step of Example 9 was not used. Black precipitates were formed by addition of the aqueous hydrazine solution, but failed to redisperse. No colloidal palladium solution was obtained.

Comparative Example 6

Treatment was carried out in the same manner as in Example 10, except that the 3-mercaptopropionic acid used in the first step of Example 10 was not used. Black precipitates were formed by addition of the aqueous hydrazine solution, but failed to redisperse. No. colloidal platinum solution was obtained.

Comparative Example 7

Treatment was carried out in the same manner as in Example 11 except that the 3-mercaptopropionic acid used in the first step of Example 11 was not used. Black precipitates were formed by addition of the aqueous hydrazine solution, but failed to redisperse. No colloidal gold solution was obtained.

Comparative Example 8

Treatment was carried out in the same manner as in Example 12 except that the mercaptoacetic acid used in the first step of Example 12 was not used. Black precipitates were formed by addition of the aqueous sodium borohydride solution, but failed to redisperse. No colloidal copper solution was obtained.

Comparative Example 9

Treatment was carried out in the same manner as in Example 1 except that ammonia water was used in place of the monoethanolamine and the mercaptoacetic acid used in the first step of Example 1 was not used. Black precipitates were formed by addition of the aqueous sodium borohydride solution, but failed to redisperse. No colloidal silver solution was obtained.

Comparative Example 10

Treatment was carried out in the same manner as in Example 1 except that the pH adjustment in the third step of Example 1 was not made. The pH of the solution became 6.5 and the colloidal silver particles failed to redisperse. No colloidal silver solution was obtained.

Evaluation 1

Dispersion stability of colloidal metal solutions (Samples A to S) obtained in Examples 1 to 19 was evaluated. Evaluation was made by measuring particle sizes of colloidal metal particles in the colloidal metal solutions at the beginning and after storage for three months at room temperature by a microtrack UPA 9340 type particle size distribution meter (made by Nikkiso Co., Ltd.). Particle sizes were given by average particle sizes on the median basis. Appearance changes and precipitate formation were also visually observed.

Results are shown in Table 1. It was found that the present colloidal metal solutions had no changes in the dispersion state of colloidal metal solutions had no changes in the dispersion state of colloidal metal particles even before and after the storage and had a distinguished dispersion stability. Neither appearance changes nor precipitate formation were observed in all the samples even after the storage for three months.

TABLE 1

| Example No. | Sample No. | Content of colloidal metal particles (wt. %) | Content of sulfur compound (parts by weight per part by weight of colloidal metal particles) | Color | Storage stability | |
|---|---|---|---|---|---|---|
| | | | | | Particle size at the beginning (nm) | Particle size after 3 months (nm) |
| 1 | A | 10.2 | 0.56 | Reddish brown | 10.4 | 11.0 |
| 2 | B | 10.7 | 0.56 | Reddish brown | 11.0 | 11.1 |
| 3 | C | 10.5 | 0.56 | Reddish brown | 10.4 | 10.5 |
| 4 | D | 9.9 | 0.56 | Reddish brown | 20.4 | 21.0 |
| 5 | E | 10.1 | 0.56 | Reddish brown | 9.9 | 10.3 |
| 6 | F | 10.1 | 0.56 | Reddish brown | 11.2 | 12.3 |
| 7 | G | 9.8 | 0.56 | Reddish brown | 12.3 | 12.5 |
| 8 | H | 10.1 | 0.56 | Reddish | 12.0 | 12.7 |
| 9 | I | 11.0 | 0.56 | Blackish brown | 8.9 | 9.3 |
| 10 | J | 8.9 | 0.51 | Blackish brown | 11.9 | 12.2 |
| 11 | K | 9.4 | 0.30 | Claret | 10.0 | 10.1 |
| 12 | L | 10.1 | 0.94 | Reddish brown | 12.5 | 12.8 |
| 13 | M | 10.0 | 0.20 | Reddish brown | 9.9 | 10.5 |
| 14 | N | 11.4 | 0.20 | Blackish brown | 9.1 | 9.5 |
| 15 | O | 9.4 | 0.56 | Reddish brown | 8.7 | 9.2 |
| 16 | P | 10.2 | 0.10 | Reddish brown | 8.8 | 8.9 |
| 17 | Q | 10.1 | 0.10 | Blackish brown | 10.2 | 10.5 |
| 18 | R | 10.2 | 0.10 | Claret | 9.9 | 11.3 |
| 19 | S | 9.9 | 0.10 | Blackish brown | 10.3 | 11.0 |

(Preparation of Two-component Electroconductive Paint)

Example 20

The present two-component electroconductive paint (Sample a) consisting of a first liquid and a second liquid was prepared by mixing Sample P of Example 16 and compounds according to the following formulations by a disperser. In the first liquid the mixing proportion of acetamide was 24 parts on the basis of 100 parts by weight of water.

| First liquid | |
|---|---|
| Sample P | 4.0 g |
| Water | 25.0 g |
| Ethylene glycol monobutyl ether | 5.0 g |
| Acetamide | 6.0 g |
| Second liquid | |
| Methyl silicate 51 (made by Colcoat Co., Ltd.) | 4.6 g |
| Ethanol | 9.0 g |
| 2-Propanol | 46.8 g |
| 1-Methoxy-2-propanol | 173.0 g |
| Water | 1.0 g |
| 20% Hydrochloric acid | 0.03 g |

Example 21

The present two-component electroconductive paint (Sample b) was prepared in the same manner as in Example 20 except that the acetamide was replaced with dimethyl sulfoxide in Example 20.

Example 22

The present two-component electroconductive paint (Sample c) was prepared in the same manner as in Example 20 except that the acetamide was replaced with N-methylformamide in Example 20.

Example 23

The present two-component electroconductive paint (Sample d) was prepared in the same manner as in Example 20 except that the acetamide was replaced with ethylene glycol in Example 20.

Example 24

The present two-component electroconductive paint (Sample e) was prepared in the same manner as in Example 20 except that the acetamide was replaced with 1,3-dimethyl-2-imidazolidinone in Example 20.

Example 25

The present two-component electroconductive paint (Sample f) was prepared in the same manner as in Example 20 except that the acetamide was replaced with 4-butyrolactone in Example 20.

Example 26

The present two-component electroconductive paint (Sample g) was prepared in the same manner as in Example 20 except that the Sample P was replaced with Sample Q of Example 17 in Example 20.

Example 27

The present two-component electroconductive paint (Sample h) was prepared in the same manner as in Example 20 except that the Sample P was replaced with Sample R of Example 18 in Example 20.

Example 28

The present two-component electroconductive paint (Sample i) was prepared in the same manner as in Example 20 except that the Sample P was replaced with Sample S of Example 19 in Example 20.

Example 29

The present two-component electroconductive paint (Sample j) was prepared in the same manner as in Example 20 except that the Sample P was replace with a mixture of 3.84 g of Sample P and 0.16 g of Sample Q in Example 20.

Example 30

The present two-component electroconductive paint (Sample k) was prepared in the same manner as in Example 20 except that the Sample P was replaced with a mixture of 3.84 g of Sample P and 0.16 g of Sample R in Example 20.

Example 31

The present two-component electroconductive paint (Sample l) was prepared in the same manner as in Example 20 except that the formulation of the first liquid was replaced with the following one in Example 20. In the first liquid, a mixing proportion of acetamide was 24.5 parts by weight on the basis of 100 parts by weight of water.

| First liquid | |
|---|---|
| Sample P | 3.2 g |
| Water | 25.4 g |
| Snowtex N (20% SiO$_2$-containing Colloidal silica, made by Nissan Chemical Industries, Ltd.) | 0.4 g |
| Ethylene glycol monobutyl ether | 5.0 g |
| Acetamide | 6.0 g |

Example 32

The present two-component electroconductive paint (Sample m) was prepared in the same manner as in Example 20 except that the formulation of the first liquid was replaced with the following one in Example 20. In the first liquid, a mixing proportion of acetamide was 23.7 parts by weight on the basis of 100 parts by weight of water.

| First liquid | |
|---|---|
| Sample P | 3.2 g |
| Water | 25.33 g |
| SN-100S (aqueous dispersion of antimony-doped tin oxide, made by Ishihara Sangyo Kaisha, Ltd.) | 0.47 g |
| Ethylene glycol monobutyl ether | 5.0 g |
| Acetamide | 6.0 g |

Example 33

The present two-component electroconductive paint (Sample n) was prepared in the same manner as in Example 20 except that the acetamide was replaced with formamide (surface tension: $57 \times 10^{-3}$ N/m) in Example 20.

Comparative Example 11

It was tried to prepare a two-component electroconductive paint in the same manner as in Example 20 except that the acetamide was replaced with 1-butanol (dielectric constant: 18; surface tension: $25 \times 10^{-3}$ N/m) in Example 20, but black aggregates were formed in the first liquid, and no electroconductive paint was obtained.

Evaluation 2

A square glass substrate (75 mm×75 mm, 3 mm-thick) was mounted on a spin coater in the atmosphere at 50° C., and 1 ml of the first liquid of the two-component electroconductive paints (Samples a to n) prepared in Examples 20 to 33 was individually trickled down onto the substrate, followed by rotation at 120 rpm for 100 seconds to form an electroconductive layer thereon. Then, the second liquid was spin coated thereon under the same conditions as above, followed by heating in an oven in the atmospheric surroundings at 120° C. for 30 minutes to form a transparent electroconductive coat film. The coat film thus obtained was tested to measure the surface resistance by a surface ohmmeter (Loresta GP type, made by Mitsubishi chemical Corp.) and to measure a haze and a transmissivity by a hazemeter (DH-300A type, made by Nippon Densyoku Industries Co., Ltd.). Coat surface appearance was visually evaluated on the basis of mottles.

Evaluation results of surface resistance, haze, transmissivity and coat film appearance are shown in Table 2. It was found that the coat films thus obtained had a distinguished electroconductivity and a high transparency. The coat film appearances were also substantially satisfactory, and when non-aqueous solvents having a surface tension of not more than $50 \times 10^{-3}$ N/m, good appearances without mottles could be obtained.

TABLE 2

| Example No. | Sample | Surface resistance [Ω/Square] | Haze [%] | Transmissivity [1%] | Appearance |
|---|---|---|---|---|---|
| 20 | a | $5.9 \times 10^2$ | 0.3 | 78.0 | Good |
| 21 | b | $6.1 \times 10^2$ | 0.4 | 76.1 | Good |
| 22 | c | $4.8 \times 10^2$ | 0.3 | 77.5 | Good |
| 23 | d | $4.9 \times 10^2$ | 0.4 | 74.9 | Good |

TABLE 2-continued

| Example No. | Sample | Surface resistance [Ω/Square] | Haze [%] | Transmissivity [1%] | Appearance |
|---|---|---|---|---|---|
| 24 | e | $6.0 \times 10^2$ | 0.3 | 76.8 | Good |
| 25 | f | $7.3 \times 10^2$ | 0.3 | 74.9 | Good |
| 26 | g | $8.0 \times 10^2$ | 0.2 | 76.8 | Good |
| 27 | h | $6.9 \times 10^2$ | 0.2 | 75.5 | Good |
| 28 | i | $7.2 \times 10^2$ | 0.3 | 69.8 | Good |
| 29 | j | $5.3 \times 10^2$ | 0.2 | 71.2 | Good |
| 30 | k | $6.0 \times 10^2$ | 0.3 | 73.4 | Good |
| 31 | l | $7.8 \times 10^2$ | 0.2 | 80.1 | Good |
| 32 | m | $4.8 \times 10^2$ | 0.3 | 74.8 | Good |
| 33 | n | $2.9 \times 10^8$ | 1.2 | 49.8 | With mottles |

INDUSTRIAL UTILITY

The present colloidal metal solution comprises at least colloidal metal particles with a sulfur compound of low molecular weight on the particle surfaces and a dispersion medium, where the solution contains not less than 1 wt. % of the colloidal metal particles and has a pH of 8-14, and has a distinguished dispersion stability and is hard to aggregate even if stored for a long time, and thus can be used as a coating agent and a treating agent capable of fixing the colloidal metal particles. Substrates of ceramics, metals, etc., particularly transparent substrates of glass, plastics, films, etc., to which colloidal metal particles are fixed with the present colloidal metal solution are useful for commercial and domestic purposes as electroconductive materials, antistatic materials, electromagnetic wave shielding materials, antibacterial materials, coloring materials, catalysts, etc. Particularly, the present colloidal metal solution has a distinguished dispersion stability in spite of a low content of the sulfur compound as a protective colloid and will not deteriorate the electroconductivity inherent to the colloidal metal particles, and thus is useful also as an electroconductivity-endowing material. Furthermore, the solution contains the colloidal metal particles at a high concentration and thus can be used advantageously as mixed with various compositions.

The present process for producing a colloidal metal solution comprises a first step of forming colloidal metal particles with a sulfur compound of low molecular weight on the particle surfaces in a solution, a second step of making the pH of the solution not more than 5, thereby aggregating the colloidal metal particles and recovering the colloidal metal particles by filtration, and a third step of dispersing the recovered colloidal metal particles into a dispersion medium at a pH of 8-14, and requires no such large-scale apparatuses as centrifuges, ultrafilters, etc., and thus can prepare the colloidal metal solution advantageously in a commercial scale. Furthermore, the present process can select a concentration of colloidal metal particles as desired and thus can prepare a colloidal metal solution at a desired high concentration without any concentration operation.

The present invention also provides a two-component paint consisting of a first liquid comprising at least the colloidal metal solution and a second liquid comprising at least a curable resin component. Application of the first liquid and then the second liquid and successive curing can endow a high electroconductiveity, etc. because of the absence of insulating curable resin component at the interface between the colloidal metal particles and the substrate, and thus the present two-component paint is particularly useful as an electroconductive paint. Substrates of ceramics, metals, etc., particularly transparent substrates of glass, plastics, films, etc., to which the colloidal metal particles are fixed with the present two-component paint are useful for commercial and domestic purposes as electroconductive materials, antistatic materials, electromagnetic wave shielding materials, antibacterial materials, coloring materials, catalysts, etc.

What is claimed is:

1. A colloidal metal solution consisting essentially of colloidal metal particles with a sulfur compound of low molecular weight on the particle surfaces as a protective colloid, wherein the sulfur compound is at least one selected from the group consisting of mercaptoacetic acid, mercaptopropionic acid, thiodipropionic acid, mercaptosuccinic acid, mercaptoethanol, thiodiethylene glycol, thiodiglycolic acid, aminoethyl mercaptan, thiodiethylamine, thiourea, thioformamide and the salts thereof, the content of the sulfur compound being 0.05-1.5 parts by weight on the basis of one part by weight of the colloidal metal particles;
   a water solvent and at least one non-aqueous solvent selected from the group consisting of N-methylformamide, formamide, and N-methylacetamide, the content of the non-aqueous solvent being 15-50 parts by weight on the basis of 100 parts by weight of the water solvent; and
   wherein the solution contains not less than 1 wt. % of the colloidal metal particles and has a pH of 8-14.

2. A colloidal metal solution according to claim 1, wherein the solution contains 2-50 wt. % of the colloidal metal particles.

3. A colloidal metal solution according to claim 1, wherein the metal of the colloidal metal particles is at least one member selected from the group consisting of metals belonging to Group 8 and Group 1B of the periodic table.

4. A colloidal metal solution according to claim 1, wherein the metal of the colloidal metal particles is at least one metal selected from gold, silver, platinum, palladium and copper.

5. A colloidal metal solution consisting essentially of colloidal metal particles with a sulfur compound of low molecular weight on the particle surfaces as a protective colloid, wherein the sulfur compound is at least one selected from the group consisting of mercaptoacetic acid, mercaptopropionic acid, thiodipropionic acid, mercaptosuccinic acid, mercaptoethanol, thiodiethylene glycol, thiodiglycolic acid, aminoethyl mercaptan, thiodiethylamine, thiourea, thioformamide and the salts thereof, the content of the sulfur compound being 0.05-1.5 parts by weight on the basis of one part by weight of the colloidal metal particles, and the sulfur compound is a compound having a molecular weight of 34-200;
   a water solvent and at least one non-aqueous solvent selected from the group consisting of N-methylformamide, formamide, and N-methylacetamide, the content of the non-aqueous solvent being 15-50 parts by weight on the basis of 100 parts by weight of the water solvent; and
   wherein the solution contains not less than 1 wt. % of the colloidal metal particles and has a pH of 8-14.

6. A colloidal metal solution according to claim 1, wherein the sulfur compound is a thiol-based compound.

7. A colloidal metal solution according to claim 1, wherein the sulfur compound is at least one compound selected from mercaptoacetic acid, mercaptopropionic acid and mercaptoethanol.

* * * * *